United States Patent [19]
Hu et al.

[11] Patent Number: 5,990,040
[45] Date of Patent: Nov. 23, 1999

[54] PROMOTED AND STABILIZED COPPER OXIDE AND ZINC OXIDE CATALYST AND PREPARATION

[75] Inventors: X. D. Hu; Jon P. Wagner, both of Louisville, Ky.

[73] Assignee: United Catalysts Inc., Louisville, Ky.

[21] Appl. No.: 08/901,828

[22] Filed: Jul. 28, 1997

Related U.S. Application Data

[63] Continuation of application No. 08/584,919, Jan. 11, 1996, abandoned, which is a continuation-in-part of application No. 08/371,500, Jan. 11, 1995, abandoned.

[51] Int. Cl.⁶ ............................ B01J 23/00; C01B 31/00; C01B 3/00
[52] U.S. Cl. ..................... 502/342; 502/346; 423/437.2; 423/656
[58] Field of Search ..................................... 502/342, 346; 423/656, 437.2

[56] References Cited

U.S. PATENT DOCUMENTS

| | | |
|---|---|---|
| 1,330,772 | 2/1920 | Bosch et al. .............................. 423/656 |
| 1,866,246 | 7/1932 | Beekley ................................. 423/656 |
| 3,546,140 | 12/1970 | Gutmann et al. ....................... 423/656 |
| 3,922,337 | 11/1975 | Campbell et al. ...................... 423/656 |
| 4,126,581 | 11/1978 | Sugier et al. .......................... 423/656 |
| 4,801,574 | 1/1989 | Brown et al. .......................... 423/656 |

*Primary Examiner*—Steven Bos
*Attorney, Agent, or Firm*—Scott R. Cox

[57] ABSTRACT

A catalyst for the conversion of carbon oxide comprising 30 to 70% CuO, 20 to 90% ZnO, 0.1 to 20% of an element of Group IV-B in the form of an oxide, preferably titanium and/or zirconium, most preferably titanium, about 5 to about 40 percent $Al_2O_3$ and preferably 50 to 1000 ppm of a Group 1-A element in the form of an oxide.

14 Claims, 1 Drawing Sheet

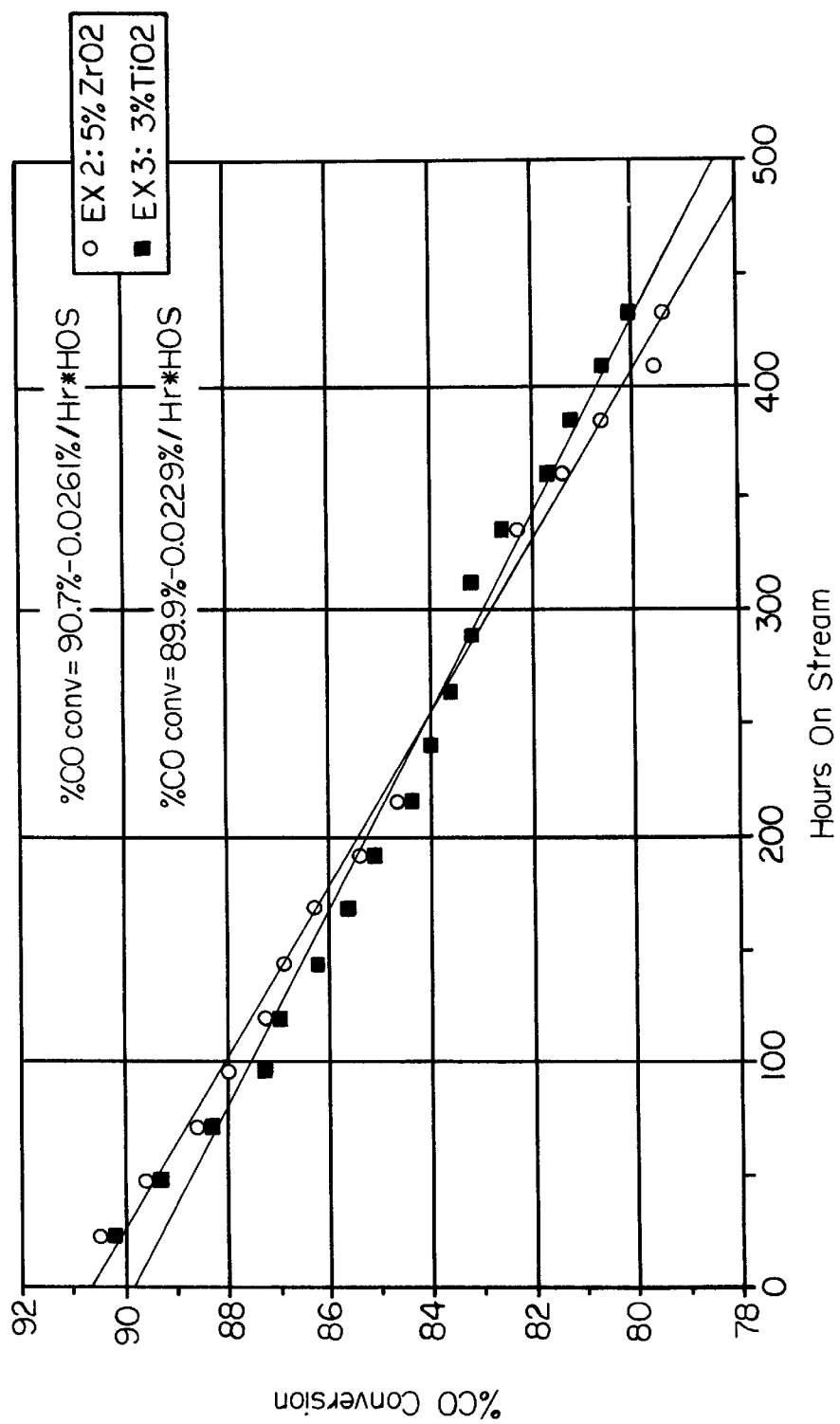

PROMOTED AND STABILIZED COPPER OXIDE AND ZINC OXIDE CATALYST AND PREPARATION

CROSS-REFERENCE TO RELATED APPLICATION

This application is a continuation of Ser. No. 08/584,919, filed Jan. 11, 1996, now abandoned, which is a continuation-in-part application of Ser. No. 08/371,500, filed on Jan. 11, 1995, now abandoned.

BACKGROUND OF INVENTION

1. Field of Invention

This invention is directed to catalysts useful in the conversion of carbon oxides. Specifically it is directed to catalyst useful in the conversion of carbon oxides and water for the production of hydrogen.

2. Prior Art

Synthesis gas represents one of the most important feedstocks of the chemical industry. It is used to synthesize basic chemicals, such as methanol or oxyaldehydes, as well as for the production of ammonia and pure hydrogen. However, synthesis gas produced by steam reforming of hydrocarbons does not meet the requirements for further use in some cases because the $CO/H_2$ ratio is too high. It is therefore industrial practice to reduce the CO content by conversion with steam.

Hydrogen is an indispensable component for many petroleum and chemical processes. Refineries in the petroleum industry, and methanol and ammonia plants in the chemical industry consume considerable quantities of hydrogen during processes for the production of gasoline and fertilizers. As environmental regulations demand cleaner, renewable and non-polluting processes and products, most of the hydrogen balances at petroleum refineries are becoming negative. As laws mandate lower aromatics in gasoline and diesel fuels, $H_2$ is now consumed in aromatic saturation and thus, less $H_2$ is available as a by-product. At the same time, $H_2$ consumption is increasing in hydro-treating units in the refineries because many of these same laws require low sulfur level in fuels.

Hydrogen is primarily obtained by steam reforming methane or mixture of hydrocarbons, a reaction which produces hydrogen, carbon dioxide and carbon monoxide. To improve $H_2$ yield and also the operating efficiency of carbon monoxide conversion, the water gas shift reaction is extensively used in commercial hydrogen or ammonia plants. The reaction can be described as:

$$CO+H_2O \ CO_2+H_2 \ H=-9.84 \text{ Kcal/mol at } 298° \text{ K}.$$

For maximum $H_2$ yield and CO conversion efficiency, the water gas shift reaction is usually carried out in two stages: at high temperatures typically 350–400° C. and at low temperature typically 180–240° C.

While lower temperatures favor more complete carbon monoxide conversion, higher temperatures allow recovery of the heat of reaction at a sufficient temperature level to generate high pressure steam. For maximum efficiency and economy of operation, many plants contain a high temperature reaction unit for bulk carbon monoxide conversion and heat recovery, and a low temperature reaction unit for final carbon monoxide conversion.

Chromium-promoted iron catalysts are normally used in the first stage at temperatures above about 350° C. to reduce the CO content to about 3–4% (see, for example, D. S. Newsom, Catal. Rev., 21, p. 275 (1980)). As is known from the literature (see for example, H. Topsoe and M. Boudart, J. Catal., 31, p. 346 (1973)), the chromium oxide promoter combines two functions. In the first place, it serves to enhance catalytic activity and in the second place, it acts as a heat stabilizer, i.e., it increases the heat stability of magnetite, the active form of the catalyst, and prevents unduly rapid deactivation under conditions of technical use.

Unfortunately, when chromium is used, especially in hexavalent form, expenditures must be incurred to guarantee worker safety both during production and later handling of the catalyst, and health hazards cannot be fully ruled out despite considerable effort. In addition, the spent catalyst ultimately poses a hazard to man and the environment and must be disposed of with allowance for the provisions in force for toxic waste.

The commonly used catalysts for water gas shift reaction at low temperature (or so-called low temperature shift reaction) in industry contain copper oxide, zinc oxide and aluminum oxide. Because these catalysts operate at relatively low temperature, they generate equilibrium carbon monoxide concentrations of less than 0.3% in the exit gas stream over an active low temperature shift catalyst. However, performance of carbon monoxide conversion and hydrogen yield gradually decreases during normal operations as a result of deactivation of the catalyst. This deactivation is caused by poisoning, generally from traces of chloride and sulfur compounds in the feed and the hydrothermal environment of the reaction. The rate of the hydrothermal deactivation, in particular, is dependent on reaction conditions such as temperature, steam to gas ratio and composition of the feed gas mixture, and is closely dependent on the formulation and manufacturing process of the catalyst.

A typical composition of a low temperature shift catalyst is comprised of from 30 to 60% of CuO, 20 to 50% of ZnO and 5–40% of $Al_2O_3$. The catalyst is usually made by either co-precipitation of metal salts (nitrate, sulfate, or acetate), thermal decomposition of metal complexes, or impregnation of metal salt onto a carrier. Depending on the preparation conditions (pH, temperature, addition rate and composition), one or several of the following mixed copper/zinc hydroxy carbonate phases are present in the precursor of the catalyst: (a) malachite $Cu_2CO_3(OH)_2$, (b) rosasite $(Cu,Zn)_2CO_3(OH)_2$, (c) hydrozincite $Zn_5(CO_3)_2(OH)_6$, (d) aurichalcite $(Cu,Zn)_5(CO_3)_2(OH)_6$, and (e) hydrotalcite $(Cu,Zn)_6Al_2(OH)_{16}CO_3$. The catalyst is then washed to remove foreign ions, dried and calcined at an appropriate temperature to form oxides. With appropriate precursors and preparation conditions, a mixed copper/zinc oxide phase rather than segregated cupric oxide and zinc oxide will be formed during calcination at 250–450° C. The catalyst must be reduced with hydrogen at 100–300° C. before being put on stream. During reduction, copper oxide in cupric form is reduced to either metallic copper or/and cuprous oxide.

It is well accepted that reduced copper is an active species for low temperature shift catalyst. The reaction is initiated by adsorption of water and carbon monoxide molecules, proceeds with dissociation of water, and completes with association of the adsorbed intermediates to form hydrogen and carbon dioxide. All the steps mentioned above are carried out on the surface of copper active sites. In general, copper-based catalysts are very susceptible to thermal sintering which results in a loss of copper surface area and therefore activity. This situation arises because of high dispersion of the reduced copper on the catalyst and high mobility of the highly dispersed copper crystallites. With the presence of steam under the reaction environment, a rapid loss of copper surface area occurs as a result of sintering.

Under some extreme catalyst testing conditions (high steam to carbon ratio), 30 to 50% of the original copper surface area may be lost in a test of 10 to 15 days depending upon the formulation and preparation method. It is believed that an industrial low temperature shift catalyst copper is partially stabilized by zinc oxide and aluminum oxide. In the presence of significant partial pressures of steam as in the low temperature shift conditions, zinc oxide selectively adsorbs water. Migration and/or inclusion of copper into a zinc oxide matrix inhibits copper crystallite growth. In addition, zinc oxide protects copper from poisoning of chloride and sulfur. The appropriate incorporation of aluminum in the matrix of copper oxide and zinc oxide can further increase the hydrothermal stability of copper.

As mentioned above, standard catalysts for this conversion stage are based on Cu—Zn oxide. See, for example, U.S. Pat. No. 1,809,978. This type of catalyst has a major drawback of extremely low heat stability so that its use is essentially limited to temperatures below about 250° C. Further catalyst developments have focused on conversion activity at lower temperatures. See U.S. Pat. No. 3,303,001.

U.S. Pat. No. 4,308,176 describes catalysts for conversion of carbon monoxide based on copper oxide and/or zinc oxide on aluminum oxide spinels, wherein the catalyst is improved by the incorporation of zinc oxide into the pores of the spinel structure. U.S. Pat. No. 3,922,337 discloses a low-temperature carbon monoxide shift catalyst containing copper and zinc oxides, wherein a sodium alkalized alumina improves resistance against halogen poisoning. See also U.S. Pat. No. 3,518,208.

European Patent No. 0 296 734 B1 discloses a copper containing catalyst for carbon monoxide conversion. The catalyst is formed from copper oxide and one or more other oxidic materials generally including zinc oxide. The catalyst may also contain oxides of at least one other element selected from the group of aluminum, vanadium, chromium, titanium, zirconium, thorium, uranium, molybdenum, tungsten, manganese, boron, and the rare earth elements. Preferably, alumina is used. The catalyst produced possesses high specific copper surface area outside the range of conventional, unpromoted copper/zinc catalyst. See also U.S. Pat. No. 4,711,773.

Copper-containing catalysts for low temperature shift conversion may also include a potassium component to suppress the formation of by-products, such as amines and methanol as disclosed in U.S. Pat. No. 5,128,307. A similar type of catalyst may also be "alkali doped" as disclosed in U.S. Pat. No. 5,021,233.

In addition, catalysts for the reaction of carbon monoxide with steam containing copper, zinc, and at least one metal selected from manganese and the metals of Groups II to V on the Periodic Table wherein those metals preferably include aluminum or magnesium, although titanium or zirconium or thorium can be used are disclosed in G.B. 1,131,631.

Catalysts for use in carbon monoxide shift reactions comprised of a copper/zinc/alumina precursor and another metal selected from the group of lanthanum, cerium, or zirconium are disclosed in U.S. Pat. No. 4,835,132.

U.S. Pat. No. 4,683,218 discloses a catalyst for a water gas shift reaction comprised of zinc, copper, an element from the lanthanum group and from the rare earth group.

Although copper is physically and physicochemically stabilized by both zinc oxide and aluminum oxide and attempts of further stabilization of the catalyst have been made as taught by prior art, sintering of copper crystallite is still a main cause for deactivation/aging of the catalyst, especially when there are very low concentration of poison in the feed. For example, the copper crystallite size of a fresh catalyst ranges from 30–100 angstroms in contrast with 100–1,000 angstroms over a discharged used catalyst from the plant. The known catalysts thus need to be improved with regard to activity and stability.

A major reason for lack of superior activity and hydrothermal stability over the known catalyst is due to lack of significant electronic modifications and interactions among copper, zinc oxide and aluminum oxide. One or several highly thermally stable component(s) is(are) thus needed to act as a promoter/stabilizer of the catalyst and it(they) should have one or several of the following functions:

(1) Modify the catalyst into a suitable morphological form with typical particle size from 20–200 microns;

(2) Modify the catalyst with desirable pore structure with peak of the pore distribution at around 50–200 angstroms and the total pore volume at 0.2–0.4 cc/g;

(3) Modify the catalyst with desirable BET surface area in the neighborhood of 40 to 200 $m^2/g$;

(4) Construct and reinforce the framework of the catalyst so that the catalyst can maintain its physical integrity and strength under certain mechanical, thermal, and/or reaction forces encountered in industrial applications; and (5) Separate the Cu/ZnO crystallites and put appropriate space among them so that the Cu/ZnO pair is able to be well dispersed throughout the catalyst structure.

(6) Allow electron transfer between copper and the promoter and enhance interaction among the components.

The objective of the present invention thus is a catalyst for a CO conversion process that has superior activity and hydrothermal stability.

It is a further object of the present invention to produce a long life low temperature water gas shift catalyst.

It is a still further object of the present invention to prepare a catalyst for a CO conversion process that exhibits significant hydrogen production over the lifetime of the catalyst.

It is a still further object of this invention to produce a catalyst that can be used for other processes in which carbon oxides are converted to methane and/or methanol.

SUMMARY OF INVENTION

In accordance with the present invention there is provided a catalyst useful in the conversion of carbon monoxide comprised of 30 to 70% CuO, 20 to 90% ZnO, 0.1 to 20% of a Group IV-B (CAS notation) element, preferably titanium and/or zirconium, most preferably titanium, in the form of an oxide as a promoter and 50 to 1000 ppm of a Group I-A element, in its oxide form as a co-promoter. The said catalyst also preferably contains about 5 to about 40% of $Al_2O_3$ as a structural stabilizer.

The invention is also a process for low temperature shift conversion of carbon monoxide by use of the above referenced catalyst.

The catalyst of this invention is preferably used in a process in which carbon monoxide and water are converted to carbon dioxide and hydrogen at temperatures in the range between 150° and 350° C., under pressures from 1.5 to 70 bars at dry gas space velocities from 5,000 to 30,000 and at steam to gas ratio from 0.3 to 2.

BRIEF DESCRIPTION OF THE DRAWINGS

FIG. 1 is comparison of catalysts where either $TiO_2$ or $ZrO_2$ were used as the Group IV B element in the catalyst.

DESCRIPTION OF THE INVENTION

The chemical composition of the catalyst before reductive activation, expressed by weight percentage based on dry weight (no volatile content) after calcination at a temperature of at least 600° C. of an already calcined catalyst sample, is comprised of the following: 30 to 70% copper oxide, preferably 30–60%; 20 to 90% zinc oxide, preferably 20–50% as the active components; 5–40% aluminum oxides, preferably 5–20%; 0.1 to 20% of a Group IV-B element in the form of an oxide as a promotor/stabilizer, preferably titanium and/or zirconium, most preferably titanium; and 50 to 1000 ppm of Group I-A element in the form of an oxide, preferably potassium oxide and/or cesium oxide as a copromoter/stabilizer. While the preparation of the copper and zinc oxide components is conventional, the nature and amount of the promoters/stabilizers utilized in the catalyst and the catalyst's method of production are important to the operation of the catalyst.

While any of the elements of Group IV B may be used as the promoter/stabilizer, preferably zirconium and/or titanium are used. Most preferably, it has been surprisingly discovered that titanium oxide-based catalysts perform better than zirconium oxide-based catalysts.

The amount of promoter/stabilizer utilized in the catalyst needs to be controlled within certain limitations. In the case of Group IV-B elements (preferably titanium and/or zirconium, most preferably titanium), this level ranges from 0.1 to 20%, preferably 0.2–10%, depending on the method of preparation. For example, if the promoter is added to the mixture of the metal salts in coprecipitation, the amount of the promoter should be at the high end of the range, whereas if the promoter is added to the surface of a finished catalyst using the impregnation method, it should be at the low end of the range. Below this range, insufficient amounts of the promotor are available to react, whereas above this range, the effective copper surface is reduced by the promoter and an insufficient amount of active sites is available for significant occurrence of the reaction. If an excess amount of the Group IV-B promoter is utilized, the promoting element can behave as a suppressant to the activity of the catalyst.

The chemical components containing Group I-A elements can be chosen from hydroxide, bicarbonate, carbonate, chloride, bromide, acetate, citrate, oxalate, sulfate and nitrate, preferably, hydroxide, oxalate, bicarbonate, carbonate or nitrate. For Group IV-B elements, the promoter can be prepared from oxide, hydroxide, chloride, sulfate, isopropoxide and protoxide, preferably, oxide, hydroxide and sulfate. As C, Cl and S are contaminants for the catalyst, a thorough washing of the resulting precipitates (catalyst precursor) and/or ion-exchange is important in preparation of the catalyst.

A homogeneous mixture of the promoter and the copromoter with CuO/ZnO ensures an intimate interaction among the components. It is advantageous to prepare the catalyst using one or combination of the following methods: coprecipitation, decomposition, impregnation and mechanical mixing, preferably coprecipitation and decomposition. The method chosen should guarantee intense blending of the components. In coprecipitation, the catalyst is prepared by mixing the acidic metal salt of copper, zinc, aluminum, the appropriate Group I-A element and the appropriate Group IV-B element, preferably titanium and/or zirconium, most preferably titanium, with a basic carbonate or bicarbonate solution at a pH range from about 6–9 and a temperature range from ambient to about 80° C., washing at a temperature ranging from ambient to about 50° C., filtering at ambient temperature, drying at a temperature range from about 100 to 160° C., calcinating at a temperature from about 170 to 500° C. and finally forming the product into desirable size and geometric shape.

Heat treatment or calcination can be conducted under static conditions, for example, in a tray furnace, or under dynamic conditions, such as in a rotary kiln. The temperatures and residence times are determined for each individual type of catalyst.

U.S. Pat. No. 3,615,217 teaches the process of the decomposition method. In preparation of the decomposition solution, a copper and zinc complex, e.g. amine carbonates, solution is mixed with proper forms of aluminum compounds and compounds of Group I-A and Group IV-B elements which are generally less soluble in an aqueous solution. The solution is then heated up to 120° C. in a container either under vacuum or ambient pressure, typically under slightly positive pressure, and the solid is obtained until all the ammonia and a significant portion of the carbon dioxide is released. Post-treatment of the solid similar to the procedure used in coprecipitation leads to formation of the final catalyst. Impregnation of the solution containing the Group I-A and/or Group IV-B inorganic or organic compounds, preferably organic compounds, onto the catalyst can be carried out at any stage of the preparation, being advantageous to spray or mix the solution containing promoter/stabilizer and copromoter/stabilizer onto the slurry after aging, washing, filtration or drying. A further drying after impregnation is needed to ensure the completion of decomposition of the promoter compounds.

The BET surface of the catalyst is at least about 40 to about 200 $m^2/g$, and, preferably, about 80 to about 140 $m^2/g$. The BET surface is determined by $N_2$ adsorption according to the single-point method, as described in DIN 66 132.

The specific pore volume of the catalyst determined by Hg porosimetry is from about 0.2 cc/g to about 0.4 cc/g. The specific pore volume is determined according to the mercury penetration method described in J. Van Brakel, et al., Powder Technology, 29, p.1 (1981). In this method, mercury is pressed up to a pressure of about 4000 bar into the catalyst moldings, during which the volume reduction of the mercury is plotted as a function of pressure. A curve is obtained from which the pore distribution can also be determined. According to this mercury penetration method, only the volume and distribution of pores with a diameter of >3.6 nm can be determined.

Known methods can be used to form the catalyst mass. Preferred forming methods are pelletizing and extrusion, in which the use of inorganic or organic auxiliaries as lubricants or to improve plasticity during extrusion is recommended. Forming can also be undertaken both before and after calcination.

The catalysts preferably occur as moldings, especially in the form of spheres, pellets, rings, tablets or extruded products, in which the latter are formed mostly as solid or hollow objects in order to achieve high geometric surface with a simultaneously low resistance to flow. Honeycombs are particularly preferred shapes.

The catalyst is preferably employed in a process in which carbon monoxide and water are converted in the temperature range between about 150° and about 350° C., under pressures from about 1.5 to about 70 bars at dry gas space velocity of about 5000 to about 30,000 and at a steam to gas ratio of about 0.3 to 2.0 carbon.

Although the catalyst is preferably utilized in a process in which carbon monoxide and water are converted to carbon dioxide and hydrogen, other process utilizing copper-based catalysts can also be enhanced by use of the catalyst. For example, the catalyst can be used for converting carbon monoxide and/or carbon dioxide to methanol and/or higher alcohols in the presence of hydrogen and other inert gases at temperatures in a range of about 200° to 400° C. Further, the catalyst can be used for the removal of traces of oxygen, hydrogen, chloride and/or carbon monoxide from a gas stream. In addition, the catalyst can be used for general hydrogenation processes in which conventional copper-based catalysts are used.

The catalyst according to this invention makes it possible to carry out the process under the above described conditions of low temperature shift in greater efficiency than the known catalysts, typically 5 to 20% higher in activity, 5–15% longer in life and therefore, 10–40% higher in total $H_2$ production over the lifetime of the catalyst.

The following examples describe production and use of the catalyst employed according to the invention:

EXAMPLE 1 (Comparative)

A copper solution was first prepared with 254 grams of copper being added to a solution containing 728 grams of 28% $NH_4OH$ and 316 grams of $NH_4HCO_3$, and at least 4882 ml of water being needed for every 1000 grams of copper. The copper solution is allowed to sit at 70 to 78° C. with vigorous agitation and with fast $O_2/N_2$ gas flow, the $O_2$ concentration in the gas mixture being 10% or higher. A zinc solution was then prepared in a similar manner with a slightly different recipe using 523 grams of zinc added to a solution of 1456 grams of $NH_4OH$, 632 grams of $NH_4HCO_3$ and 2620 grams of water. 1973 grams of the copper solution was mixed with 1414 grams of the zinc solution under agitation. The combined copper zinc solution was rapidly reacted with 80 grams of alumina in a 14 liter reactor at 77–85° C. in a fashion such that the temperature increase was gradual until the color of the solution turned from dark blue to light blue gray. During reaction, agitation must be kept vigorous. The solid was then filtered with a two-liter Buchner funnel and a four-liter filtration flask with vacuum being provided by a Venturi water suction device. This Example illustrates the decomposition method of forming the catalyst. This same method is used in Examples 2, 3, 4, 6 and 7. The resulting solid was dried at 150° C. over-night and calcined in controlled atmosphere at 370° C. The catalyst tablets of 4.76×2.38 mm were formed by pressing the solid powder together with 2% graphite. The physical and chemical properties of the resulting catalyst (EX1) is summarized in Tables 1 and 3.

EXAMPLE 2

The preparation of the copper and zinc solution followed the description in Example 1. The combined copper/zinc solution was added to a slurry containing 70 grams of alumina and 25 grams of zirconia at a rate of 40 ml/min. As with Example 1, this catalyst contained no $TiO_2$. The reaction temperature was gradually increased from 70° C. to 90° C. with agitation. The post-treatment of the resulting slurry followed Example 1. The physical and chemical properties of the resulting catalyst (EX2) are listed in Tables 1 and 3.

EXAMPLE 3

The preparation of the catalyst (EX3) followed the descriptions in Examples 1 and 2 except a mixture of $Al_2O_3$—$TiO_2$ was prepared. This catalyst contained no $ZrO_2$. The potassium solution was prepared by dissolving a predetermined amount of potassium oxalate powder containing 1.5 gram of potassium in double de-ionized water. The amount of potassium oxalate used is determined by the grade and hydration level of the material. The potassium solution was then mixed with 1000 grams of titania. The titania slurry was maintained under agitation for at least 10 minutes, and then filtered in the same apparatus described in Example 1 repeatedly after being re-slurred with additional double de-ionized water and dried at 120° C. overnight. To prepare the catalyst, EX3, it took 15 grams of the dried potassium modified titania and 80 grams of alumina. BET surface area of the catalyst promoted with titania and potassium was 120 $m^2/g$. The remaining information can be found in Tables 1 and 3.

EXAMPLE 4

The preparation of the catalyst (EX4) followed the methods found in EX1, EX2 and EX3 except 37.5 grams of potassium containing titania was used. No $ZrO_2$ was present in this catalyst. The amount of alumina is 80 grams. See Tables 1 and 3 for data concerning the composition of the catalyst (EX4).

EXAMPLE 5

Solution A was made containing 1952 grams of 18% copper nitrate, 1952 grams of zinc nitrate, and 1323 grams of a 4% aluminum nitrate solution. Solution B was made by adding 61 grams of titanium oxysulfate to 500 ml of de-ionized water. Then Solution A and Solution B were mixed together to make Solution C at 55° C. and kept under vigorous agitation for 30 minutes. Solution D was made by adding potassium carbonate to de-ionized water until saturation. Solution D remained at 55° C. under agitation. Both Solution C and Solution D were then pumped to a tank (precipitation tank) simultaneously in a fashion such that the rate of addition of Solution D was varied to maintain a constant pH from about 7 to 8 during the precipitation at 55 ml/min of a constant flow rate of the Solution C. The precipitation tank was maintained at 60° C. The formed slurry after Solution C mixing with Solution D in the precipitation tank was directed to an aging tank which was also maintained at 60° C. Throughout the precipitation, the slurry in the precipitation tank as well as in the aging tank were maintained in a state of suspension to avoid rapid agglomeration of the formed solid particles. After completion of Solution C, the slurry was maintained under agitation for another additional 30 minutes and then it was filtered, washed, dried and calcined. The potassium content was 300 ppm. The procedure of filtering, drying and calcination followed the description in Example 1. This Example illustrates the coprecipitation method of forming the catalyst. The resulting catalyst was formed into tablets (EX5). See Table 3.

EXAMPLE 6

The preparation of the catalyst EX6 followed the description in Example 3 except using titanium oxysulfate instead of titanium oxide. The amount of titanium oxysulfate used in this example followed Example 5. See Table 3.

EXAMPLE 7

The preparation of the catalyst EX7 followed the description in Example 3 except using titanium chloride. 95 grams of titanium chloride was mixed with the copper, zinc, and aluminum solution. See Table 3.

EXAMPLE 8

2.3 grams of titanium isopropoxide was carefully added into 7.4 grams of n-hexane under nitrogen atmosphere to make Solution A. No Group I-A element was used with this catalyst. The amount of the Example 1 powder was 32.4 grams. The Solution A was then slowly added to EX1 powder and allowed to be evacuated under nitrogen for 60 minutes. The resulting material was dried with flowing air at a rate of 5 liter/minutes. The temperature of drying started at 26° C. and was gradually brought to 71° C. in a three hour period. The material was then calcined at 370° C. for two hours and made into catalyst E8. This example illustrates the impregnation method of forming the catalyst. See Table 3.

TABLE 1

Table 1 is a description of the composition of the catalyst of Examples 1 through 4.

|       | % CuO | % ZnO | % $Al_2O_3$ | % $ZrO_2$ | K, ppm | $TiO_2$ |
|-------|-------|-------|-------------|-----------|--------|---------|
| Ex. 1 | 48.6  | 35.3  | 16.1        | 0.0       | 0.0    | 0.0     |
| Ex. 2 | 47.2  | 34.3  | 13.6        | 4.9       | 0.0    | 0.0     |
| Ex. 3 | 47.2  | 34.3  | 15.6        | 0.0       | 44     | 2.9     |
| Ex. 4 | 45.2  | 32.9  | 14.9        | 0.0       | 105    | 7.0     |
| Ex. 6 | 46.3  | 33.0  | 15.0        | 0.0       | 0.0    | 5.7     |
| Ex. 7 | 45.5  | 32.4  | 14.7        | 0.0       | 0.0    | 7.4     |

TABLE 2

Table 2 is a comparison of the performance of the catalyst of Example 2, where zirconium oxide is used, and Example 3, where titanium oxide was substituted for the zirconium oxide. See Figure 1.

| Hours on stream | Example 2 (5% $ZrO_2$) | Example 3 (3% $TiO_2$) |
|---|---|---|
| 24 | 90.5 | 90.2 |
| 432 | 79.4 | 80.1 |
| regression slope (×104) | 26.1 | 22.9 |
| Relative stability, % | 0 | +14 |

TABLE 3

Physical and Chemical Properties of EX1–EX8 Catalysts

| Catalyst | EX1 | EX2 | EX3 | EX4 | EX5 | EX6 | EX7 | EX8 |
|---|---|---|---|---|---|---|---|---|
| XRD (x-ray defraction) CuO MCS (mean crystallite size) | 71 | 32 | 55 | 68 | 49 | 205 | <10 | 56 |
| ZnO MCS | <10 | 67 | 58 | 39 | 49 | <10 | <10 | 55 |
| Bulk Density (lb/cubic feet) | 72.9 | 79.0 | 81.5 | 87.6 | 81.6 | 78.1 | 78.5 | 78.4 |
| Surface Area ($mm^2$/g) | 96 | 108 | 120 | 97 | 121 | 94 | 85 | 105 |
| Pore Volume (cc/g) | 0.36 | 0.31 | 0.26 | (not available) | | | | |
| Crush Strength (lb, DWL) | 15 | 18 | 24 | 47 | 39 | 25 | 25 | 28 |

Test Data

CO conversion activity was measured by passing a gas described in Table 4 over the catalyst at a pressure of 10.3 bar and a temperature of 204° C. The dry gas space velocity was 11,250 volumes of gas per hour per volume of catalyst, and the steam to gas ratio was 1.5 on a molar basis. Before the activity analysis the catalysts were loaded into a laboratory test reactor and pretreated to obtain the active species. The pretreatment consisted of heating the catalyst in a flowing stream of hydrogen and nitrogen at a pressure of 3.5 bar to a final temperature of 204° C. which was maintained for 16 hours.

TABLE 4 feed gas composition 3.0% CO
17.0% $CO_2$
2.0% $N_2$
78.0% $H_2$

The catalysts: EX1 made according to Example 1, and EX3 made according to Example 3 were evaluated for activity in terms of CO conversion as defined below:

%CO conversion={(moles CO inlet−moles CO exit)/ moles CO inlet}*100%

The activity in terms of CO conversion was measured after the catalyst were exposed to the feed gas for 4 hours to establish steady state conversion. The exit gas was analyzed by gas chromatography after the residual water had been condensed from the product gases. The results are summarized in Table 5.

TABLE 5

|  | EX 1 | EX 3 |
|---|---|---|
| % CO Conversion | 89.2 | 93.1 |

Higher CO conversion increases ammonia and methanol plant's efficiencies because more $H_2$ is produced and therefore there is less CO to methanate which in turn will consume less $H_2$. Higher CO conversion will also decrease the purge rate in the synthesis loop resulting in less $H_2$ loss in the purge gas. In ammonia and methanol plants the production rate increases with increased hydrogen production.

Due to the nature of the carbon monoxide conversion reaction, equilibrium is favored at lower temperatures. A catalyst that exhibits high CO conversion activity can be operated at lower temperatures where the reaction equilibrium can be exploited. Operating at lower temperatures would also decrease the rate of deactivation caused by thermal affects, i.e. decreased copper sintering rate.

To measure the CO conversion stability, the feed gas and test condition as described in Table 4 was maintained for long periods of time while the exit gas was monitored routinely. Data from the extended tests are summarized in Table 6.

TABLE 6

% CO Conversion Stability

| Hours on Stream | EX 1 | EX 3 | EX 4 |
|---|---|---|---|
| 4 | 88.9 | 91.3 | 90.3 |
| 28 | 87.8 | 90.1 | 89.8 |
| 124 | 85.1 | 88.5 | 88.4 |

TABLE 6-continued

% CO Conversion Stability

| Hours on Stream | EX 1 | EX 3 | EX 4 |
|---|---|---|---|
| 244 | 82.0 | 87.6 | 86.3 |
| 364 | 79.9 | — | 85.1 |

As the data indicate, the catalyst(s) prepared by the method described in Example 1 did not maintain the high CO conversion with time on stream. In comparison the catalysts prepared by the method described in Examples 3 and 4 exhibited better activity stability as time on stream increases. In industrial applications, this is an accumulative effect which will correspond to longer lives with higher hydrogen production throughout the entire life of the catalyst.

The CO conversion stability can be confirmed with the analysis of the catalysts after the extended stability test. As discussed previously, one of the major causes of deactivation of the copper catalysts is the sintering of the copper crystallites. X-ray diffraction is an industry accepted method for determining the average size of crystalline compounds that exceed 3.0 nm. Data collected on the spent catalysts is summarized in Table 7 and expressed in terms of mean crystallite size in nanometers (mcs, nm).

TABLE 7

X-Ray Diffraction Data

| | Hours on Stream | After Test Cu° (mcs, nm) |
|---|---|---|
| EX 1 | 244 | 25.1 |
| EX 3 | 244 | 16.0 |
| EX 1 | 364 | 27.6 |
| EX 4 | 364 | 15.0 |

In addition to the improvement of the catalyst as shown in Example 3 and 4 over that of Example 1, these results also show that the catalyst of Example 3, which uses titanium oxide, when compared with the catalyst of Example 2, which uses zirconium oxide, had a higher initial activity and enhanced stability over a longer period of time. This enhancement translates into longer operating life in commercial applications. When the data was compared by linear regression, the linear slope shows that the catalyst containing titanium oxide exhibited 14 percent greater activity stability than the catalyst containing zirconium oxide. See FIG. 1. Thus, it was surprisingly discovered that the catalyst produced by the process of the instant invention containing titanium oxide performed even better than the catalyst of similar construction which contained zirconium oxide as a component of the catalyst.

The data also shows that the catalysts prepared by the methods described herein exhibit significantly lower copper crystallite growth compared to catalyst EX1.

We claim:

1. A carbon oxide conversion catalyst which, before reductive activation measured by weight on a dry weight basis after calcination at a temperature of at least about 600° C., consists essentially of about 30–70% CuO, about 20–50% ZnO, about 5–40% of aluminum oxide, and about 0.2–20% of an oxide of titanium as a promoter and stabilizer.

2. The catalyst of claim 1 containing about 40–1000 ppm of a Group I-A element.

3. The catalyst of claim 1 wherein the CuO comprises about 30–60 percent of the catalyst.

4. The catalyst of claim 1 wherein the aluminum oxide comprises about 5 to 20 percent of the catalyst.

5. The catalyst of claim 2 wherein the Group I-A element is selected from the group consisting of potassium and cesium.

6. The catalyst of claim 2 wherein the Group I-A element is potassium.

7. The catalyst of claim 1 containing about 0.2 to about 10% of the oxide of titanium.

8. The catalyst of claim 1 wherein prior to calcination titanium is in a form selected from the group consisting of an oxide, hydroxide, chloride, sulphate, isopropoxide and propoxide.

9. The catalyst of claim 1 wherein prior to calcination, titanium is in a form selected from an oxide or a hydroxide.

10. The catalyst of claim 2 wherein prior to calcination the Group I-A element is in a form selected from the group consisting of hydroxide, bicarbonate, carbonate, chloride, bromide, acetate, citrate, oxalate, sulphate and nitrate.

11. The catalyst of claim 2 wherein prior to calcination the Group I-A element is in a form selected from the group consisting of hydroxide, oxalate, bicarbonate, carbonate or nitrate.

12. The catalyst of claim 1 wherein the BET surface of the catalyst is at least about 40 m$^2$/g.

13. The catalyst of claim 1 in the form of spheres, pellets, tablets, rings, solid, hollow or shaped extrudates.

14. A process for converting a gas stream comprising carbon monoxide and water to carbon dioxide and hydrogen at a temperature in the range of about 150° to about 350° C. comprising passing the gas stream over the catalyst of claim 1.

* * * * *